United States Patent
Hwang et al.

(10) Patent No.: US 6,626,634 B2
(45) Date of Patent: Sep. 30, 2003

(54) METHOD OF DISTRIBUTING BEVERAGES WITH IMPROVED SHIPPING TRAY

(75) Inventors: Phillip C. Hwang, Los Angeles, CA (US); William P. Apps, Los Angeles, CA (US); Norman C. Strohfus, Eagan, MN (US); Robert W. Grace, Twinsburg, OH (US); David J. Glancy, Twinsburg, OH (US)

(73) Assignee: Coca Cola Enterprises, Atlanta, GA (US)

( * ) Notice: Subject to any disclaimer, the term of this patent is extended or adjusted under 35 U.S.C. 154(b) by 0 days.

(21) Appl. No.: 09/910,236

(22) Filed: Jul. 20, 2001

(65) Prior Publication Data

US 2001/0041131 A1 Nov. 15, 2001

Related U.S. Application Data

(62) Division of application No. 09/315,403, filed on May 20, 1999.
(60) Provisional application No. 60/086,135, filed on May 20, 1998, and provisional application No. 60/094,439, filed on Jul. 28, 1998.

(51) Int. Cl.$^7$ .............................................. B65G 57/00
(52) U.S. Cl. .................. 414/801; 414/810; 414/788.2; 108/51.11; 108/53.1; 108/56.1; 220/9 F
(58) Field of Search ................ 414/801, 800, 414/810, 788.2; 108/51.11, 53.1, 53.3, 56.1, 53.5, 56.3, 52.1; 220/9 F, 23.6

(56) References Cited

U.S. PATENT DOCUMENTS

| | | | | |
|---|---|---|---|---|
| 3,702,100 A | * | 11/1972 | Wharton | 108/58 |
| 3,780,905 A | * | 12/1973 | Herolzer | 220/97 D |
| 3,949,876 A | * | 4/1976 | Bridges et al. | 206/427 |
| 3,995,749 A | * | 12/1976 | Haskins | 214/10.5 R |
| 4,103,857 A | * | 8/1978 | Levenhagen | 248/346 |
| 4,550,830 A | * | 11/1985 | Shuert | 206/386 |
| 4,562,718 A | * | 1/1986 | Dunk | 72/349 |
| 4,750,623 A | * | 6/1988 | Flum | 211/59.4 |
| 5,809,905 A | * | 9/1998 | John et al. | 108/56.1 |
| 5,860,369 A | * | 1/1999 | John et al. | 108/57.26 |
| 5,960,720 A | * | 10/1999 | Borland et al. | 108/53.1 |
| D417,786 S | * | 12/1999 | Hwang et al. | D3/314 |
| 6,026,754 A | * | 2/2000 | Kohlhaas | 108/56.3 |
| 2001/0026743 A1 | * | 10/2001 | Krawczyk | 410/66 |

* cited by examiner

Primary Examiner—Joseph A. Fischetti
(74) Attorney, Agent, or Firm—Miller & Martin LLP

(57) ABSTRACT

A method of utilizing a mini-pallet to create, organize, and move product stacks. In a preferred configuration, the mini-pallet is a nestable lightweight shipping tray which provides a convenient means for handling packaged units, in particular packages of beverage containers. The mini-pallet can support loads at an elevation above a supporting surface through the use of a deck supported by two side legs and a central support. The legs are located to facilitate a user in positioning a carrier under the deck for transportation. The central support, in a preferred embodiment, compatibly fits with a designated opening in the lifting portion of the carrier. When not loaded, the mini-pallet is capable of "nesting" within another mini-pallet for convenient storage.

20 Claims, 8 Drawing Sheets

METHOD OF DISTRIBUTING BEVERAGES WITH IMPROVED SHIPPING TRAY

This application is a division of U.S. Ser. No. 09/315,403 filed May 20, 1999 which in turn claims the benefit of provisional applications 60/086,135 filed May 20, 1998 and 60/094,439 filed Jul. 28, 1998 under 35 U.S.C. 119(e).

BACKGROUND OF THE INVENTION

1. Field of the Invention

The present invention relates to the use of an apparatus to facilitate the distribution of beverages, and particularly beverages with a limited shelf life or rapid sales turnover subject to frequent restocking, such as soft drinks. More particularly, the present invention relates to the use of an improved shipping tray, which when utilized in its preferred embodiment, provides a nestable, lightweight shipping pallet of a moldable material.

2. Description of Related Art

One current method of beverage distribution essentially considers the beverage truck driver a salesman. The driver's truck is loaded with a selection of beverages, and the driver calls on accounts on a route. At each account, the driver determines what beverages are required or desired by the account, then the driver locates the beverages in his truck, unloads the beverages and delivers them to the account. This process would be relatively easy if only a single beverage were involved. For instance, if the driver only distributed a single brand of cola, his truck would be completely loaded with that one beverage, and it could be easily unloaded at each account, and accounts could be serviced until the truck was completely empty.

However, today beverage brands are proliferating. In addition, a single brand of beverage may come in a variety of package styles and sizes, such as cans, glass bottles, and a range of plastic containers. When a beverage truck is loaded, as many as 350 different stock keeping units (SKU's) or brand/container combinations may be loaded. In order to facilitate access to so many different SKU's, the most common beverage route truck is a side load truck, such as disclosed in U.S. Pat. No. 4,043,569 or variations thereof, with about 12 to 20 separate compartments. In this fashion, usually no more than about ten different SKU's would have to be placed in a single compartment, although in some instances over 30 SKU's may be present. After determining an account's needed beverages, the driver goes to each separate compartment required to access those beverages. In some cases it will be necessary for the driver to unload a portion of a compartment to access the needed SKU. Furthermore, when a single SKU is exhausted from the truck's supply, the driver may no longer be able to properly service the remaining accounts on the route, even though the truck continues to have an adequate supply of other beverages. This leads to trucks returning to the distribution center partially loaded, and places a valuable premium upon correctly guessing the needs of the accounts on each route. Even when side load trucks are loaded to exact route requirements from account order information, the process of having the driver select SKU's from side load truck compartments is time consuming and back breaking work.

Accordingly, as part of a new beverage delivery system to improve delivery service it is desirable to utilize an improved shipping tray. Utilizing the improved shipping tray, a truck may be loaded to specifically meet the orders of each account on a route and to minimize the time needed to select and unload the beverages ordered by each individual account. Individual trays may be loaded with packages, or individual, beverage containers of various sizes and quantities including, for example cases, 6-packs or 2-liter bottles. The packaged units may be stacked in bays in truck trailers or in special carts loaded on a truck and then driven to a delivery point. Packaged units may be loaded in columns onto shipping trays in the desired types and quantity to satisfy an order by a particular retail location. Once at the retail location, the driver can unload the stacked shipping trays with a compatible hand truck or other manual carrier. When unloaded at the retail location, the shipping tray may be used as the base for floor displays of the beverage products. This prevents damage to the products from the cleaning and floor waxing operations in the retail location.

The shipping tray provides an accessible area, below the stacked units, to receive the lifting portion, or tongue, of a hand truck. Therefore, the hand truck can readily be positioned under the shipping tray with the stacked packaged units. The packaged units may then be simply rocked into position onto the hand truck, transported to the display location and unloaded in a similar fashion. This system avoids, or reduces, manual lifting and re-stacking by the driver. Since the shipping tray is designed to accommodate case sized layers of SKU'S, the SKU's can be pre-arranged in a column-stack on the shipping tray.

It is therefore an object of the present invention to provide improved shipping trays to facilitate both the loading and unloading of trucks with beverages sorted by account order.

Another object of the invention is to provide a durable, lightweight shipping tray for handling and transporting packages or packaged units such as beverage containers.

A further object of the present invention is to provide a low profile, nestable shipping tray which occupies relatively little space both when in a loaded stacked relation and when in an empty nested relation.

A further object of the present invention is to provide a lightweight, reusable shipping tray that can be efficiently and economically manufactured.

An additional object of the present invention is to provide a lightweight shipping tray of unitary construction.

A further additional object of the present invention of the present invention is to provide an integrally molded plastic shipping tray that has sufficient structural integrity to withstand repeated and rough handling.

Another object of the present invention is to provide a lightweight shipping tray with a reinforced central support member formed from a moldable material.

Another object of the present invention provides an injection molded, durable shipping tray, preferably, a one-piece injection molded, durable shipping tray.

A still further object of the present invention is to provide a recyclable, lightweight shipping tray.

It is yet a further object of the invention to provide a novel pallet for use with a matching hand truck to facilitate the loading and unloading of beverage trucks with beverages sorted by account order.

SUMMARY OF THE INVENTION

The present invention recognizes and addresses these foregoing and other objects. The durable shipping tray of the present invention provides a convenient means for handling packaged units, in particular, packages of beverage containers. The lightweight shipping tray, or mini-pallet, can support stacked packages of beverage containers at an elevation above the floor. The primary surface or deck of the mini-pallet is substantially open, generally planar and is supported at this elevation by at least two side legs positioned proximate with the sides of the deck and a leg positioned about the center of the deck. The legs are arranged so that a portion of a carrier, such as a hand-truck, can readily be positioned sufficiently with a portion of the carrier underneath the deck to provide stable support during lifting and transporting operations. The center leg is shaped and sized to compatibly fit within a designated opening in the lifting portion of the carrier.

In the preferred embodiment, the center leg presents a continuous surface such that the carrier can be laterally moved unhindered about the leg while being positioned. Furthermore, the center legs is configured to interact with the carrier to guide and maintain the mini-pallet in a proper position on the carrier. Also in the preferred embodiment, the deck has a lattice-like configuration with a pattern of open spaces which not only allows liquids to drain through, but also requires less material and is lighter than a solid deck.

The preferred embodiment has at least two side legs configured in the shape of rails extending a substantial width of the deck to not only provide a broad support area for the deck, but also a large surface area along the underside of the legs to enhance the wearability of the legs. A further feature of the preferred embodiment is nesting pockets for receiving the legs of an identical tray stacked thereon such that mini-pallets can be nested together.

Additional objects and advantages of the invention will be set forth in part in the following description or accompanying drawings, or may be learned through the practice of the invention.

The accompanying drawings which are incorporated in and constitute a part of the specification, illustrate several embodiments of the invention and together with the description serve to explain the principles of the invention.

DETAILED DESCRIPTION OF THE DRAWINGS

Reference will now be made in detail to the presently preferred embodiments of the invention, one or more examples of which are illustrated in the accompanying drawings. Each example is provided byway of explanation of the invention, not limitation of the invention. In fact, it will be apparent to those skilled in the art that modifications and variations can be made in the present invention without departing from the scope or spirit thereof. It is intended that the present invention covers such modifications and variations as come within the scope of the appended claims and their equivalents.

The present invention is concerned with an improved shipping tray or "mini-pallet." This invention can be adapted to hold numerous types of items and is especially adaptable for depicted packaged units, for instance, packaged units of beverage containers. A preferred embodiment of the mini-pallet 100 in accordance with the present invention, is in FIGS. 1 through 8. The mini-pallet 100 is capable of supporting individual stacks or column stacks, of various units of packaged beverage containers. The deck 102 of lightweight mini-pallet 100 can support stacked packaged units of beverage containers at an elevation above the floor.

Although the mini-pallet 100 may be formed from several connected parts, the mini-pallet 100 is preferably an integrally-molded, unitary article. The mini-pallet 100 maybe injection molded in one-piece from moldable materials such as plastics. Moldable materials may include recyclable materials such as thermoplastics and may include at least in part recycled materials. Preferably, the mini-pallet 100 is formed entirely from polyolefin polymers including polyethylene and/or polypropylene free of fillers or other reinforcing materials.

Figure 1A:
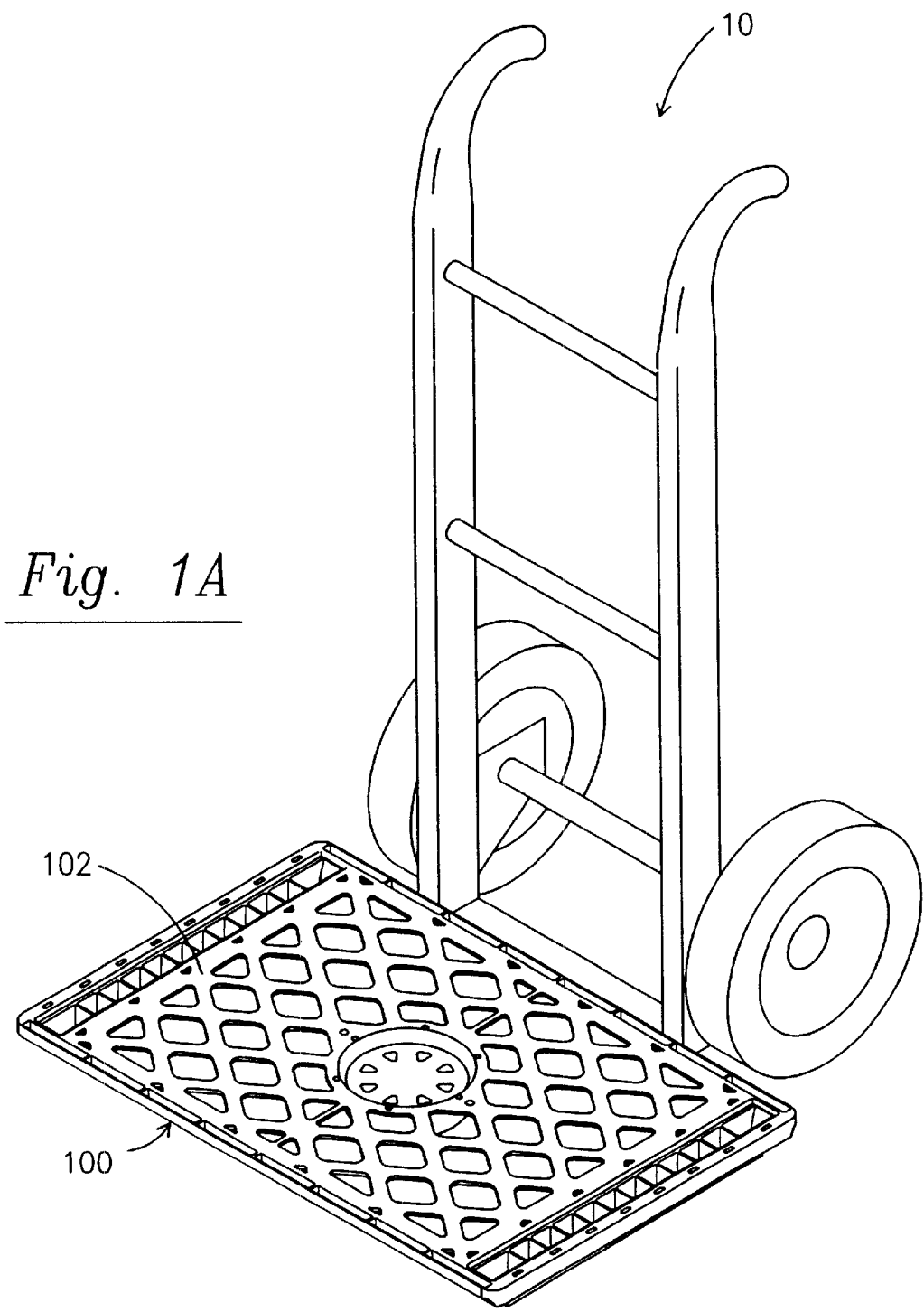
FIG. 1A is a perspective view of a mini-pallet in accordance with the present invention depicted with a hand truck.
Figure 1B:
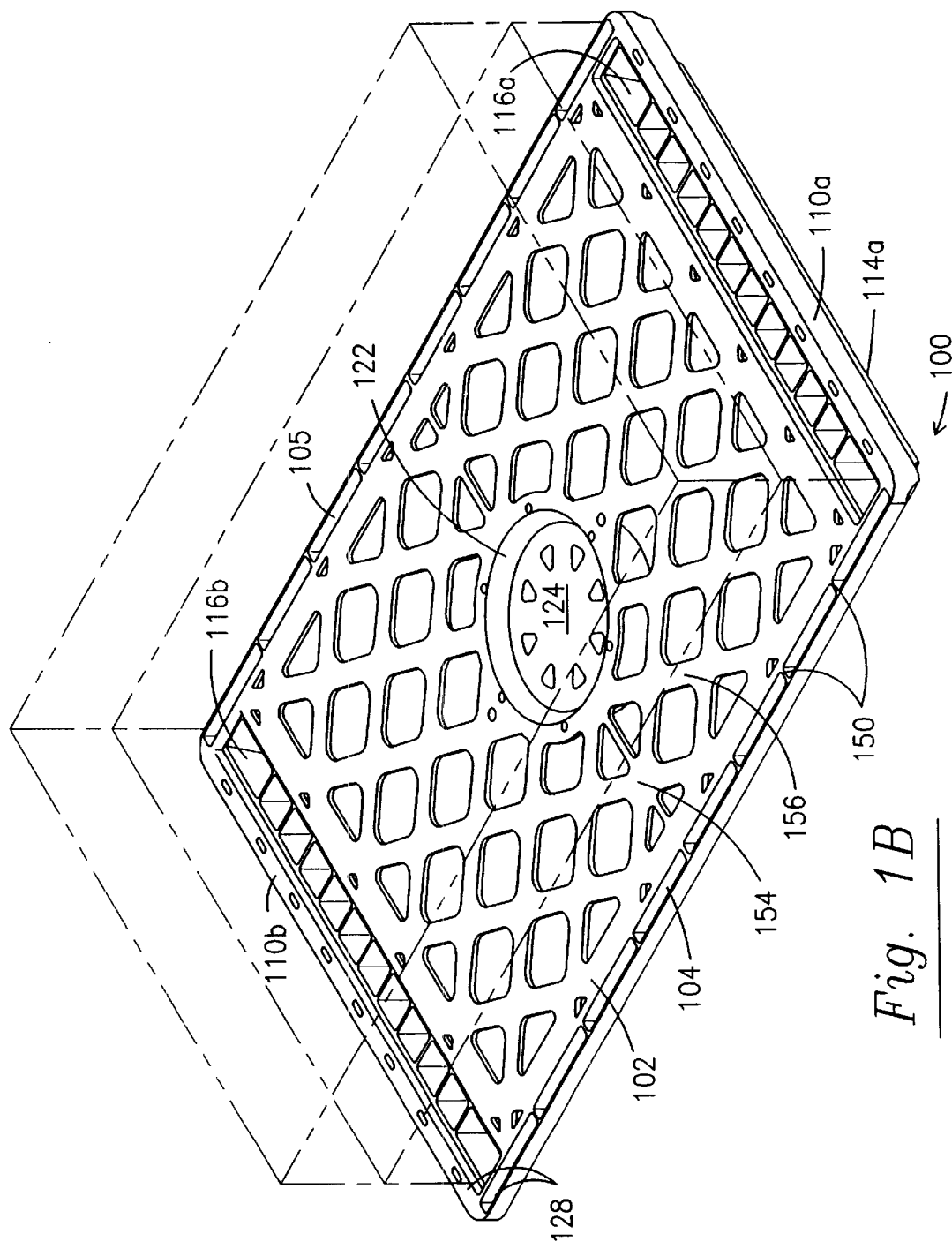
FIG. 1B is atop perspective view of a mini-pallet of FIG. 1A with packages positioned thereon shown in phantom.
Figure 2A:
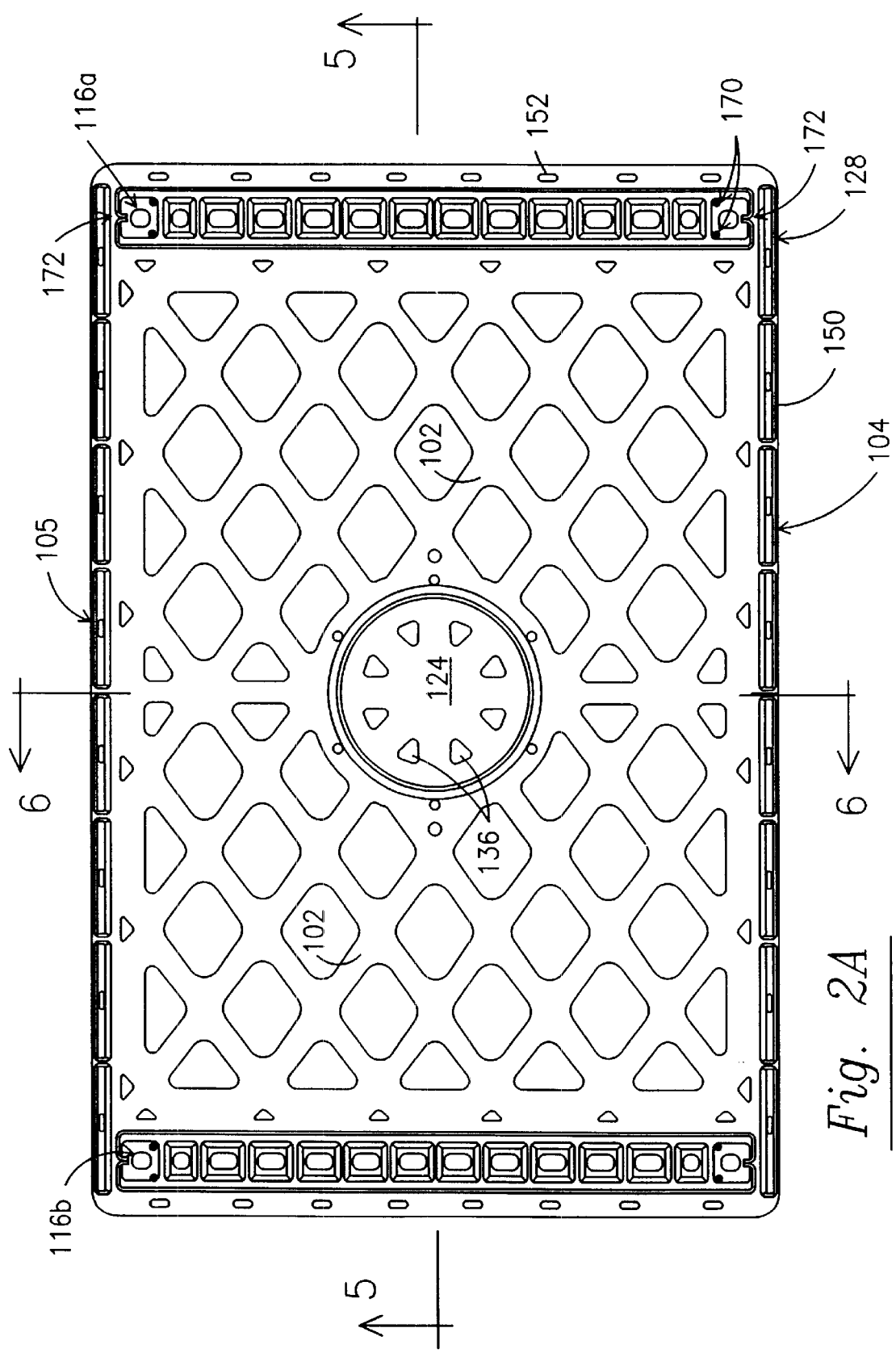
FIG. 2A is a top plan view of the mini-pallet of FIG. 1A.
Figure 5:
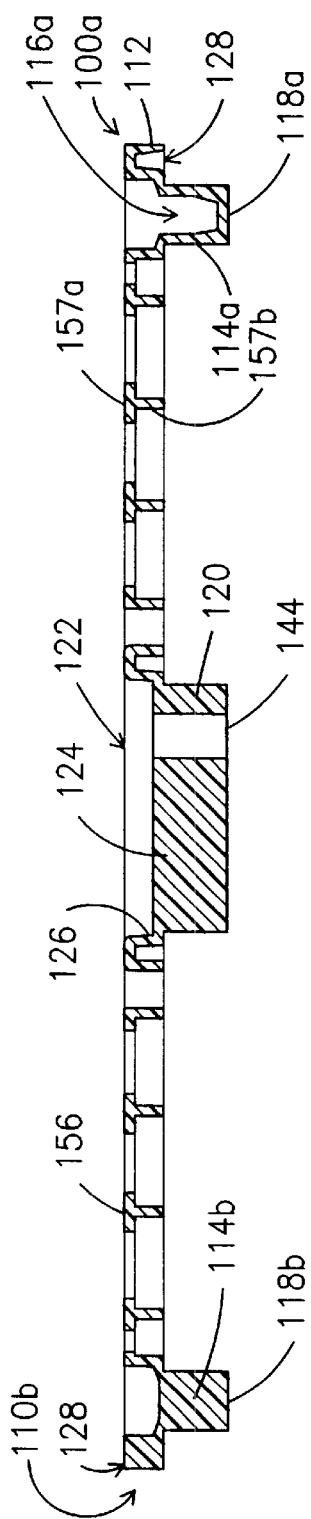
FIG. 5 is a sectional view taken along line 5—5 of FIG. 2A.

Accordingly, FIGS. 1B and 2A show the mini-pallet 100 comprising a deck 102 which, in a preferred embodiment, is a rectangular upper open work planar surface. In the presently preferred embodiment, the dimensions of the deck 102 are approximately 11"×17" in size. This size has been determined adequate to accommodate a case of twelve ounce beverages and other equivalent SKU package sizes. The perimeter of the deck 102 may include a double-wall edge 128 shown in detail in FIGS. 5 and 6, that not only strengthens the deck 102, with respect to loads normal to the deck surface, but also provides a durable edge against impacts which may occur during handling. The double-wall edge 128 extending along the front and back 104, 105 of the deck 102 are upwardly opening, and U-shaped. These U-shaped edges have a rounded on beveled lower exterior 108. On the sides 110a, 110b of the deck 102, the double-wall edge 128 has a downwardly opening U-shaped transverse cross-sectional shape 112 to prevent trapping materials within this double-wall edge 128, as shown in FIG. 5.

Figure 2B:
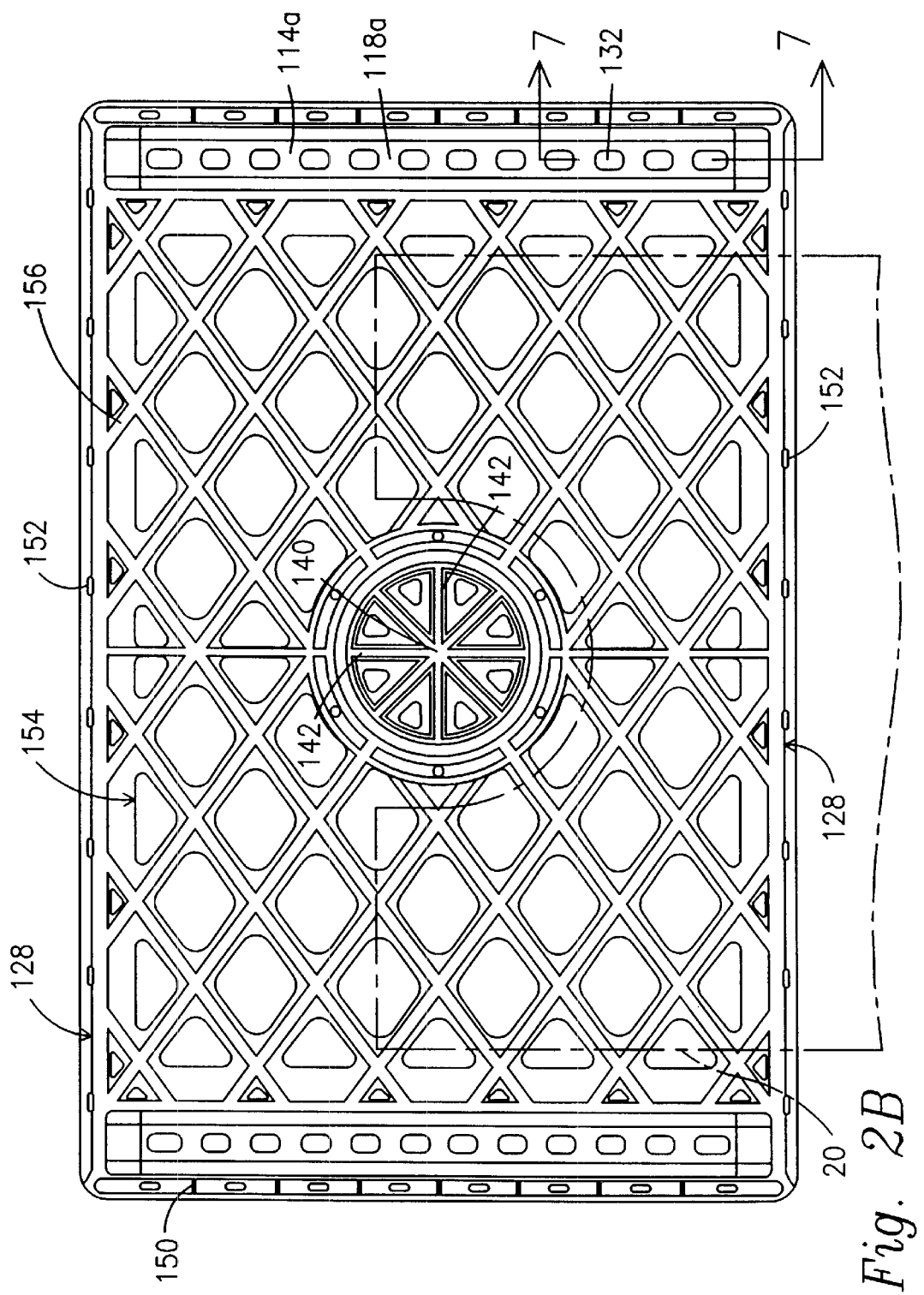
FIG. 2B is a bottom plan view of the mini-pallet of FIG. 1A, with tongue of a hand truck shown in phantom.

In FIGS. 1B and 2B spaced along the double-wall edge 128 are a series of stiffening ribs 150 extending between the inner and outer walls of the double-wall edge 128. In addition, there are a series of drain holes 152 extending through the double-wall edge 128 in a direction perpendicular to the deck 102 to allow any liquids that may accumulate on the surface or within the edge to drain. These stiffening ribs 150 and drain holes 152 are longitudinally spaced along the double-wall edge 128 in an alternating fashion.

Figure 1C:
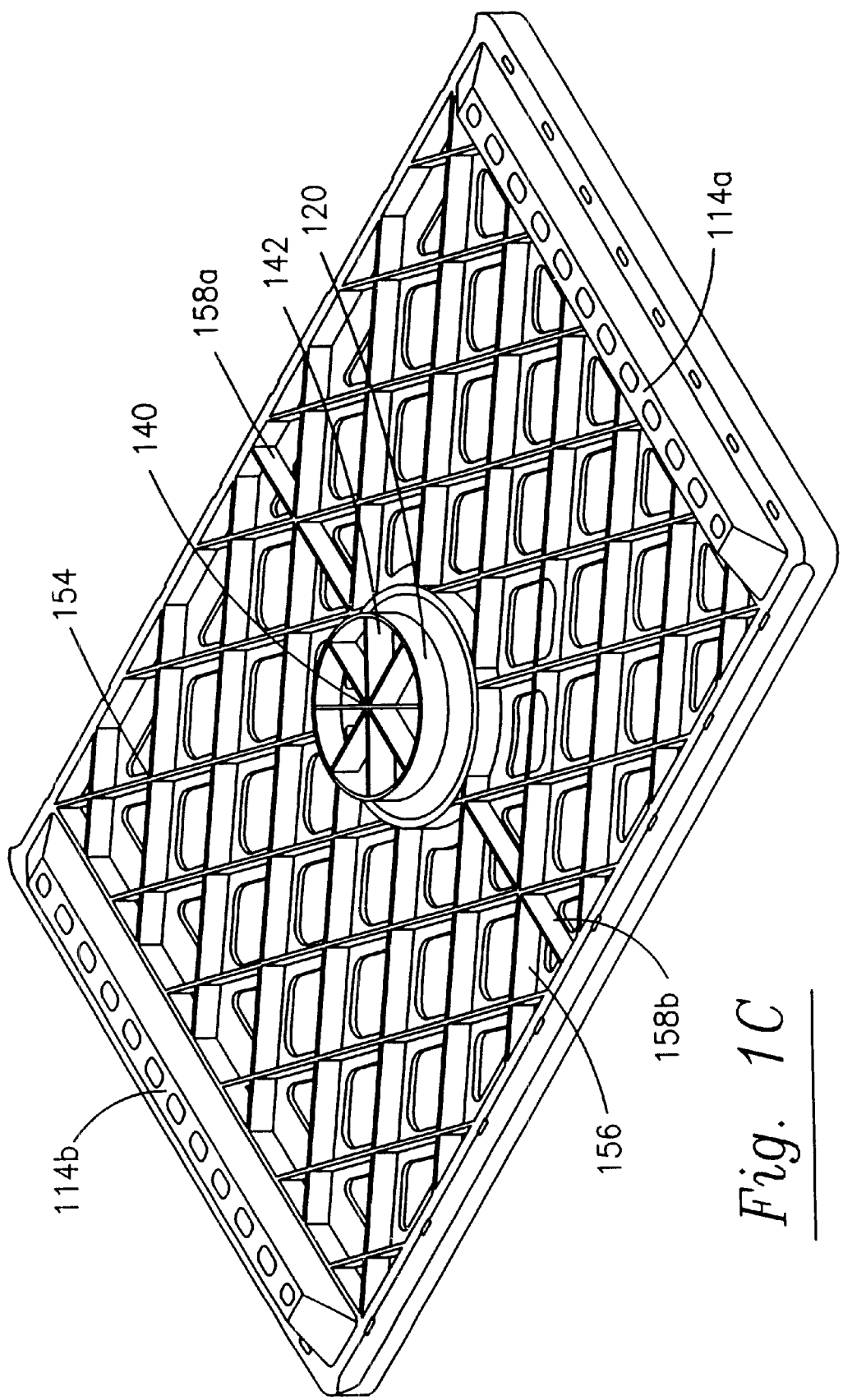
FIG. 1C is a bottom perspective view of the mini-pallet of FIG. 1A.
Figure 6:
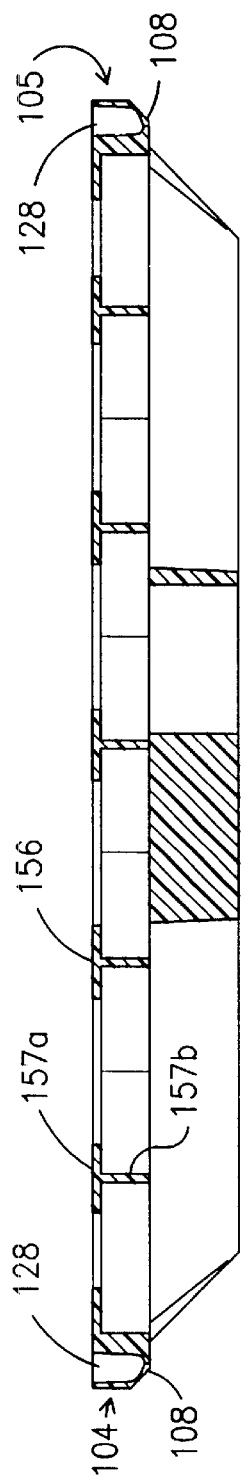
FIG. 6 is a sectional view taken along line 6—6 of FIG. 2A.

As best shown in FIGS. 1B and 1C, the balance of the deck 102, in a preferred embodiment, is composed of a system 154 of interconnecting, spaced-apart support members 156 which form a grid-like pattern, within the plane of the deck 102, connecting the central support 120, which is preferably a cylindrical leg, and rails 114a, 114b with the double-wall edge 128. The support members 156 have a T-shaped transverse cross-sectional shape, as shown in FIG. 5. For the maximum strength/weight performance, the support members 156 will be comprised of a horizontal portion 157a above a vertical portion 157b as illustrated in FIG. 6. The horizontal portion 157a forms the deck 102 while the vertical portion 157b provides strength and rigidity to support the deck. The upper surface of the deck 102 is composed of two series of intersecting spaced-apart parallel support members 156 extending diagonally within the double-wall edge 128 that intersect at an angle dictated by the overall dimension of the deck 102. In a preferred embodiment, the deck comprises an additional support members 158a, 158b extending radially outward from the central support 120 intersecting with interposing diagonally arranged support members 156 and terminating perpendicularly along the center of the front and back double-walled edge 104,105, respectively. The deck 102 preferably contains many openings not only to reduce the amount of material used in manufacture, but also to permit easy drainage for any inadvertent beverage leakage.

Proximate with the sides 110a, 110b of the deck 102, there are a pair of downwardly projecting rails 114a, 114b which act as support rails or legs. The downwardly projecting rails 114a, 114b extend a substantial width of the deck 102 in a direction parallel with the lateral sides. Preferably, each rail 114a, 114b has a corresponding rail pocket 116a, 116b opening upwardly through the upper surface of the deck.

Positioned about the center of the deck 102, projecting in the same direction and approximately the same distance below the bottom surface of the deck 102 as the rails 114a, 114b, is a central support 120. In the preferred embodiment, the central support 120 is cylindrical having an outside diameter compatible with a cutout portion 21 of a tongue 20 in a compatible hand-truck 10 used as a carrier for the mini-pallet 100, as shown in FIGS. 1A and 2B. The preferred shape of the central support 120 is that of a cylinder, but it should be obvious to one skilled in the art that the central support 120 could be rectangular, polygonal arcuate other than circular or any other shape desired. In fact, the outer edge of the central support 120 need not have a continuous outer perimeter at all but could be comprised of multiple elements.

The circular shape allows for easy positioning of the tongue 20 of the carrier 10 about the central support 120. A multi-sided polygon could easily provide the same function, however, angular supports appear to wear more rapidly. In an alternatively preferred embodiment, an even-numbered polygonal shaped central support 120 provides a similar aspect towards the front as well as to the back of the mini-pallet 100. This allows a single carrier to be utilized to pick up a loaded mini-pallet 100 from the front or from the back. The diameter of the central support 120 in the preferred embodiment is approximately 3 inches. The lower surface of the rails 114a, 114b and the central support 120 form a plane upon which the mini-pallet 100 contacts the supporting surface (such as the floor or a base of a mobile container). In the preferred embodiment, when the plane of the lower surface of the rails 114a, 114b and the central support 120 is in contact with a supporting surface, approximately ¾" clearance is provided for the deck 102 to be supported above the supporting surface. This provides adequate clearance for the tongue 20 of a hand truck 10.

The outside diameter of the central support 120 will be determined with respect to the opening 21 in the lifting tongue 20 on the carrier designed for use with the mini-pallet 100, as shown in FIG. 2B. Suitable carriers for this purpose may include customized hand-trucks, designed so that when the tray 100 is in the carrying position on the hand-truck 10 the tongue 20 extends sufficiently under the mini-pallet 100 to provide adequate support. A suitable hand-truck is the narrow aisle configuration of hand-truck model number B16-D-1040-C45-62 available from MagLine, Inc. Preferably, the tongue 20 interacts with the mini-pallet 100 such that when they are properly positioned the tongue 20 of the hand-truck 10 extends beyond the centerline of the mini-pallet 100. Typically, the central support 120 will be slightly smaller than the opening 21 in the tongue 20 so the tongue 20 and central support 120 can interact to guide and maintain the mini-pallet 100 centered on the carrier. The mating aspect of the tongue 20 and central support 120 is also intended to discourage pilferage as the center segment 72 of mini pallets 120 will not permit a non-compatible handcart tongue to reach under to even the midpoint of the pallet 100. This will make use of the pallets 100 with non-compatible hand trucks difficult.

As shown in a preferred embodiment in FIG. 5, there is an upwardly opening cylindrical pocket 122 in the upper surface of the deck 102 positioned about the center of the deck 102. The upwardly opening cylindrical pocket 122 has a base 124 parallel with the deck 102 and a generally cylindrical side wall 126 extending perpendicularly from the top surface of the deck 102 to the base 124. The base 124 of the cylindrical pocket 122 is a substantially continuous web comprising a series of drain holes 136. It should be apparent to one skilled in the art that cylindrical pocket 122 need not be circular in shape, but may take any shape. In a preferred embodiment, when nesting mini-pallets, the cylindrical pocket 122 receives a portion of a central support 120 of the next upward mini-pallet 100 as illustrated in FIG. 8.

Figure 3:
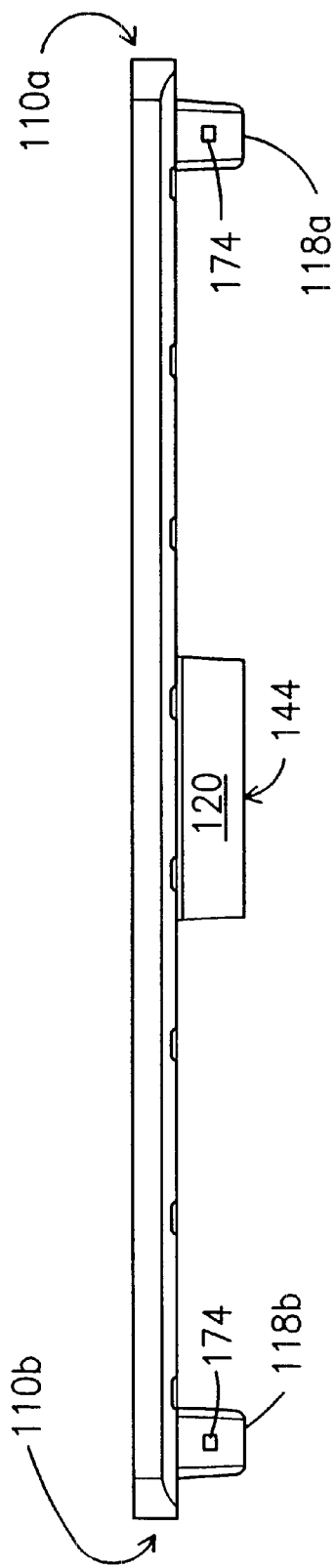
FIG. 3 is a front elevational view of the mini-pallet of FIG. 1A.

Coaxial with the cylindrical pocket 122 and extending from the underside of the base 124 is a central support 120. The central support 120 projects in the same direction and to substantially the same distance below the bottom surface of the deck 102 as the rails 114a, 114b. The support base 118a, 118b of the rails 114a, 114b and the distal end 144 of the central support 120 as shown in FIG. 3 define a plane upon which the mini-pallet 100 contacts the floor or other supporting surface.

Figure 4:
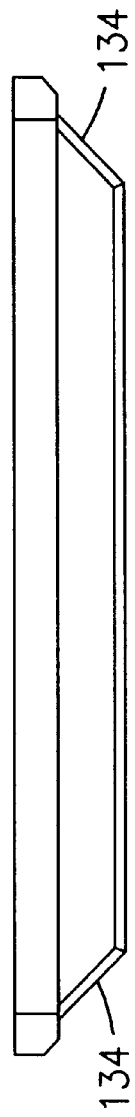
FIG. 4 is a side elevational view of the mini-pallet of FIG. 1A.
Figure 8:
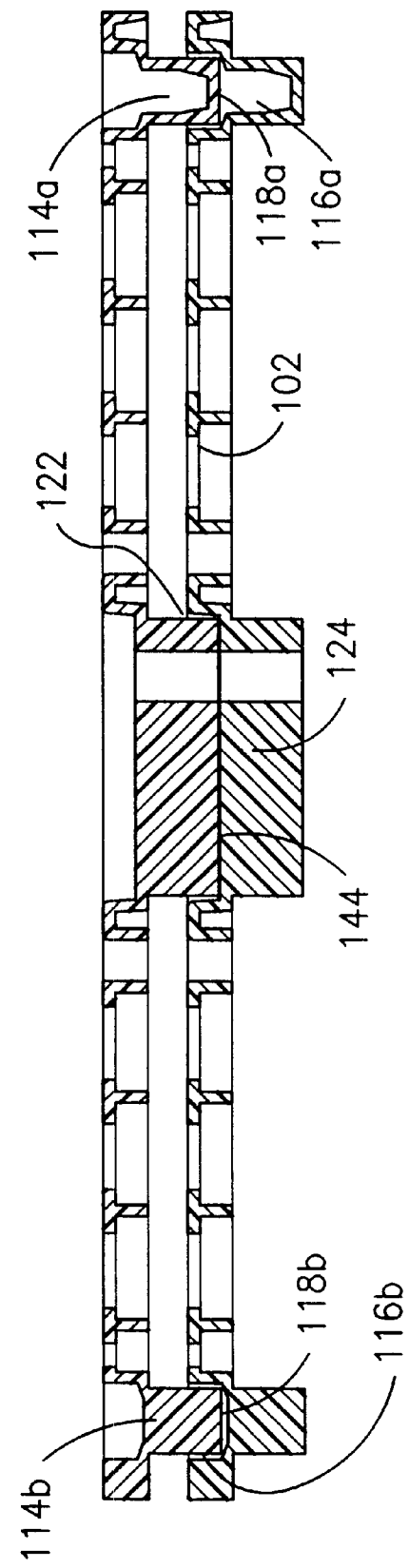
FIG. 8 is a front elevational view showing a plurality of mini-pallets in a stacked, nested disposition.

As shown in FIGS. 4 and 5, the ends of the rails 114a, 114b extend upwardly and outwardly to form an end bevel 134 which assists in guiding the rails 114a, 114b into a corresponding rail pockets 116a, 116b of an identically shaped mini-pallet 100, upon which it is to be nested, during stacking nested pallets as shown in FIG. 8. The degree of bevel in the preferred embodiment is approximately 45 degrees. As shown in FIG. 4, the rail end bevel 134 angles inward from the front and back edges of the deck 102. This not only minimizes the chances of strikes from the carrier but also reduces the force from such a strike by deflecting the impact downwardly. Preferably, the angle of the bevel 134 is such that it not only assists in positioning a leg, or rail 114a, 114b within a corresponding mini-pallet 100, during stacking, but also minimizes the lateral movement of the mini-pallets 100 once in a nested position.

Figure 7:
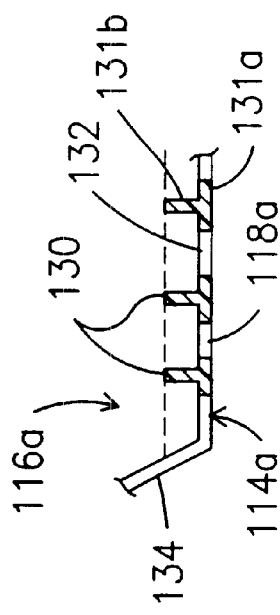
FIG. 7 is a partial sectional view taken along line 7—7 of FIG. 2B.

As shown in FIG. 7, the support base 118a of the rail 114a is substantially formed from a series of spaced apart bridging ribs 130 extending between the opposing sides of the given rail 114a, 114b. These bridging ribs 130 have an essentially inverted T-shaped transverse cross-sectional shape, comprising a horizontal base 131a and a vertical support member 131b. These inverted T-shaped bridging ribs 130 provide a substantial areas of material from their horizontal sections 131a to form the support base 118a, and added strength through the vertical sections 131b. This offers a support base with superior rigidity. Positioned along the support base between the bridging ribs 120 is at least one drain hole 132 which communicates between the rail pocket 116a and the outer surface of the rail 114a.

The top surfaces of the vertical sections 131b of the bridging ribs 130 may be coplanar with the upper surface of the base 124 of the cylindrical pocket 120 and together form a stop means. When two or more mini-pallets 100 are nested the support bases 118a, 118b of an upper mini-pallet 100 rest upon the upper surface of the bridging ribs 130, as shown in FIG. 8. Similarly, the distal end 144 of the cylindrical leg 120 will rest upon the base 124 of the lower mini-pallet 100.

As shown in FIG. 8, the rails 114a, 114b, rail pockets 116a, 116b, central support 120 and cylindrical pocket 122 combine, in the preferred embodiment, to provide the nesting capability of the mini-pallet 100. The term "nesting" refers to the ability of one mini-pallet 100 to be positioned on top of another so that the vertical components of the two mini-pallets 100 are such that the overall height is less than the sum of the height of the individual mini-pallets 100. For instance, the rails 114a, 114b and rail pockets 116a, 116b maybe tapered, as shown in FIGS. 3 and 5, so that the upper end of a rail pocket 116a or 116b defines an area larger than, and therefore capable of, receiving the lower portion of the rail 114a, 114b. Similarly, the inside diameter of the cylindrical pocket 122 should be sufficiently large enough to accommodate the outside diameter of the central support 120, as shown in FIG. 5.

In order to provide a secure fit when nesting multiple mini-pallets 100, a preferred embodiment shown in FIG. 2A utilizes fitting beads 170 and fitting teeth 172 located either within, or in close proximity to the rail pockets 116a, 116b. The fitting beads and/or fitting teeth of a first mini-pallet 100 will contact a rail 114a, 114b when a second mini-pallet 100 is nested atop the first mini-pallet 100. The fitting beads 170 may restrict side-to-side movement of a nested mini-pallet 100. The fitting teeth 172, may restrict front to back movement of a nested mini-pallet 100. One skilled in the art will know that restricting movement in one direction will likely result in restriction in movement in a perpendicular direction as well. Therefore fitting beads 170 will likely restrict movement of a nested mini-pallet from front-to-back as well as from side-to-side. It should be evident to one skilled in the art that the fitting teeth 172 and fitting beads 170 need not be utilized together in a single rail pocket 116a, 116b. It should also be obvious to one skilled in the art that the fitting beads 170 and fitting teeth 172 may be utilized singularly rather than in multiples as depicted in the drawings. Fitting beads 170 and fitting teeth 172 are fabricated as an integral part of the mini-pallet 100 in a presently preferred embodiment, however, one skilled in the art will know that other materials such as rubbers, other plastics, etc., may be utilized. Fitting teeth 172 may also engage with notches 174 and the end levels 134 of rails 114a, 114b as shown in FIG. 3.

In a presently preferred embodiment, concentrically positioned inside the central support 120 is a cylindrical support 140. Extending radially from the cylindrical support 140 outwardly to the central support is a series of spaced apart reinforcing ribs 142, as shown in FIG. 2B. The combination of the radially extending ribs 142 and cylindrical support 140 combine to provide a lateral support structure for the central support 120 which improves its ability to withstand forces imposed transverse to its axis. For instance, the force imparted by the tongue of a carrier during transport of the mini-pallet 100 with stacked beverage containers or empty mini-pallets 100 positioned thereon. Typically, the central support 120 and radially extending ribs 142 will extend from the plane defined by the distal end 144 of the cylindrical leg 120 up to the base 124 of the cylindrical pocket. Additionally, in a preferred embodiment, aside from the radially extending reinforcing ribs 142 and the cylindrical support 140, the interior of the central support 120 is downwardly open from the underside of the cylindrical base so as to prevent trapping of debris within the leg.

We claim:

1. A method for distributing beverages to account locations on a route from a truck utilizing mini-pallets of the type having a deck with two downwardly projecting rails spaced apart from one another, a downwardly projecting central support intermediate the two downwardly projecting rails, and a pocket coaxial with said central support adapted to receive at least a portion of a similarly shaped mini-pallet's central support when multiple mini-pallets are nested, said method consisting of the following steps:

(a) loading each mini-pallet with beverages intended for a single account location to form a beverage stack on the mini-pallet at a warehouse location;
   (b) placing the mini-pallets loaded with beverages for account locations on the route on the truck;
   (c) a driver driving the truck to a first account location;
   (d) placing a tongue of a hand-truck under a mini-pallet loaded with beverages for the present account location, said tongue having a width less than the space between the rails and having a compatible recess adapted to receive the central support of said mini-pallet;
   (e) lifting the mini-pallet with the hand-truck;
   (f) the driver off-loading the mini-pallet and the hand-truck from the truck to the present account location;
   (g) unloading the beverage stack from the hand-truck;
   (h) repeating steps (d) through (g) for each mini-pallet loaded for the present account location;
   (i) driving the truck to the next location on the route; and
   (j) repeating steps (d) through (i) until the route is complete.

2. The method of distributing beverages of claim 1 wherein in step (b) the mini-pallets loaded with beverages are placed in bays on the truck.

3. The method of distributing beverages of claim 1 wherein in step (b) the mini-pallets loaded with beverages are placed in carts that are loaded on the truck.

4. The method of distributing beverages of claim 1 wherein the unloaded beverage stack in step (g) is left on the mini-pallet which serves as a base for a floor display at the account location.

5. The method of distributing beverages of claim 1 wherein the deck of the mini-pallets has a perimeter comprising a double-wall edge.

6. The method of distributing beverages of claim 5 wherein the double-wall edge further comprises at least two stiffening ridges longitudinally spaced along and connected to the double-wall edge.

7. The method of distributing beverages of claim 6 wherein the double-wall edge has a U-shaped transverse cross-section, and at least two drain holes located on the double-wall edge.

8. The method of distributing beverages of claim 1 wherein the deck comprises a plurality of spaced-apart linear support members and at least two openings providing communication through the deck.

9. The method of distributing beverages of claim 8 wherein the linear support surfaces have a horizontal deck forming portion and a vertical reinforcing portion.

10. The method of distributing beverages of claim 8 wherein the linear support members have a T-shaped cross-sectional shape.

11. The method of distributing beverages of claim 1 wherein the deck comprises a plurality of radially extending reinforcing ribs.

12. The method of distributing beverages of claim 8 wherein the spaced-apart linear support members form a grid-like pattern among the openings and connect the central support, said downwardly projecting rails, and the double-wall edge.

13. The method of distributing beverages of claim 1 wherein the mini-pallet further comprises a rail pocket opening upwardly through an upper surface of the deck, compatible with a downwardly projecting rail of a similarly shaped mini-pallet, and adapted to receive at least a portion of said similarly shaped mini-pallet rail when multiple mini-pallets are nested.

14. The method of distributing beverages of claim 13 wherein the mini-pallet further comprises a fitting member within the rail pocket configured to contact a similarly configured mini-pallet's downwardly projecting rail when the similarly configured mini-pallet is nested atop the mini-pallet.

15. The method of distributing beverages of claim 1 wherein the downwardly projecting rails further comprise at least two lateral walls with bridging ribs, a horizontal base to form a lower surface of said projecting rails, and a vertical support member.

16. The method of distributing beverages of claim 10 wherein the bridging ribs have an inverted T-shaped cross-section.

17. The method of distributing beverages of claim 1 wherein the central support has a substantially continuous circular outer perimeter.

18. The method of distributing beverages of claim 1 wherein the central support has an outer edge defining an even-sided polygon.

19. The method of distributing beverages of claim 1 wherein the pocket comprises reinforcing ribs connected to an interior surface of said pocket.

20. The method of distributing beverages of claim 1 wherein after unloading a beverage stack in step (g), an unloaded mini-pallet is stacked upon another unloaded mini-pallet in a nested configuration.

* * * * *